US012686328B1

(12) United States Patent
Chen

(10) Patent No.: US 12,686,328 B1
(45) Date of Patent: Jul. 21, 2026

(54) REARVIEW MIRROR DEVICE WITH SIGNAL LIGHT

(71) Applicant: KEN SEAN INDUSTRIES CO., LTD., Changhua County (TW)

(72) Inventor: Sheng-Hung Chen, Changhua County (TW)

(73) Assignee: KEN SEAN INDUSTRIES CO., LTD., Fuxing Township, Changhua County (CN)

( * ) Notice: Subject to any disclaimer, the term of this patent is extended or adjusted under 35 U.S.C. 154(b) by 0 days.

(21) Appl. No.: 19/184,082

(22) Filed: Apr. 21, 2025

(30) Foreign Application Priority Data

Mar. 4, 2025   (TW) ................................. 114202135

(51) Int. Cl.
*B60Q 1/26* (2006.01)
*B60R 1/072* (2006.01)
*B60R 1/12* (2006.01)

(52) U.S. Cl.
CPC ............ *B60Q 1/2665* (2013.01); *B60R 1/072* (2013.01); *B60R 1/1207* (2013.01)

(58) Field of Classification Search
CPC .... B60Q 1/2665; B60Q 3/258; B60R 1/1207; F21S 4/26; F21S 4/24
See application file for complete search history.

(56) References Cited

U.S. PATENT DOCUMENTS 5,587,699 A * 12/1996 Faloon .................. B60R 1/1207
340/475
2004/0052084 A1 * 3/2004 Lin ........................ B60R 1/1207
362/135
2023/0039412 A1 * 2/2023 Wei ........................ B60R 1/1207
2024/0042935 A1 * 2/2024 Herrmann ................ B60R 1/06
2024/0212504 A1 * 6/2024 Ruiz Ortega ........ B60Q 1/2665

FOREIGN PATENT DOCUMENTS

DE      102011106838 A1 * 1/2013 ............. B60Q 9/008

OTHER PUBLICATIONS

Machine translation of Max et al., DE 102011106838A1, published Jan. 10, 2013 (Year: 2013).*

* cited by examiner

*Primary Examiner* — William N Harris
(74) *Attorney, Agent, or Firm* — patenttm.us

(57) ABSTRACT

A rearview mirror device has a housing, a mirror disposed in the housing, a light-transmitting gap formed between an internal peripheral surface of the housing and the mirror, and a light emitting element disposed at a rear of the mirror. The light emitting element has a light emitting portion arranged along a periphery of the mirror and facing toward the internal peripheral surface of the housing. When the light emitting portion emits light toward the internal peripheral surface of the housing, the light, passing through the light-transmitting gap between the internal peripheral surface of the housing and the mirror, is used as a signal light for warning the driver or other road users. An eye-catching signal light without decreasing a visible area of the mirror is provided.

8 Claims, 9 Drawing Sheets

1

REARVIEW MIRROR DEVICE WITH
SIGNAL LIGHT

BACKGROUND OF THE INVENTION

1. Field of the Invention

The present invention relates to a rearview mirror of a
vehicle, and more particularly to a rearview mirror device
with a signal light.

2. Description of Related Art

To improve driving safety, a direction indicator light or a
blind spot detection signal light is usually arranged at a side
rearview mirror of a vehicle. When the driver intends to
change lanes, other road users can be warned by the direc-
tion indicator light on the side mirror. When a blind spot
detection system detects vehicles therearound, the driver
may be warned by the blind spot detection signal light on the
side rearview mirror to beware of vehicles at the blind spot,
thereby reducing traffic accidents.

A conventional side rearview mirror with a signal light
has a mirror having a reflection region and a light-transmit-
ting region. A light emitting element is disposed at a rear side
of the light-transmitting region and emits light toward the
mirror. Light emitted by the light emitting element may pass
through the light-transmitting region of the mirror for warn-
ing the driver or approaching vehicles.

However, the conventional side rearview mirror with a
signal light has shortcomings as follows. The mirror needs
the light-transmitting region for light passing therethrough,
and the smaller the light-transmitting region is, the less
obvious the light signal is. So the light signal may not be
noticed by the driver, and the driver may not be effectively
warned. The larger the light-transmitting region is, the
smaller the reflection region is, and a visible area of the
rearview mirror is smaller, thereby the blind spot being more
obvious.

Therefore, the conventional side rearview mirror device
with a signal light still has shortcomings that need to be
improved.

To overcome the shortcomings, the present invention
tends to provide a rearview mirror device with a signal light,
to mitigate or obviate the aforementioned problems.

SUMMARY OF THE INVENTION

The main objective of the present invention is to provide
a rearview mirror device with a signal light, which can
provide an eye-catching signal light without decreasing a
visible area of the rearview mirror device.

The rearview mirror device comprises a housing com-
prising an internal peripheral surface, a mirror disposed in
the housing, a light-transmitting gap formed between the
internal peripheral surface of the housing and the mirror, and
a light emitting element disposed at a rear of the mirror. The
light emitting element comprises a light emitting portion
arranged along a periphery of the mirror and facing toward
the internal peripheral surface of the housing. When the light
emitting portion emits light toward the internal peripheral
surface of the housing, the light passes through the light-
transmitting gap.

Other objects, advantages and novel features of the inven-
tion will become more apparent from the following detailed
description when taken in conjunction with the accompa-
nying drawings.

2

Figure 1:
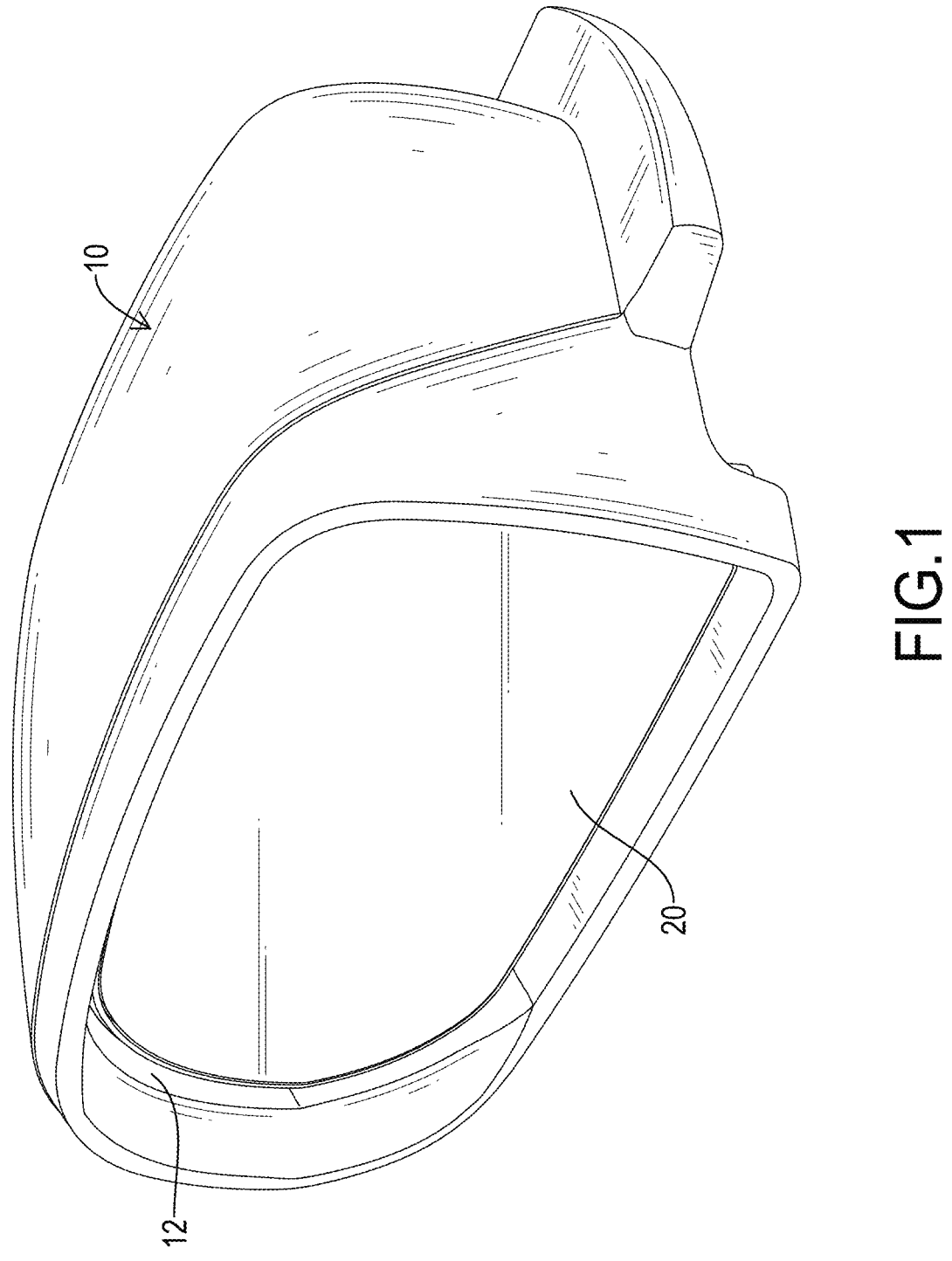
FIG. 1 is a perspective view of a first embodiment of a
rearview mirror device with a signal light in accordance with
the present invention.
Figure 2:
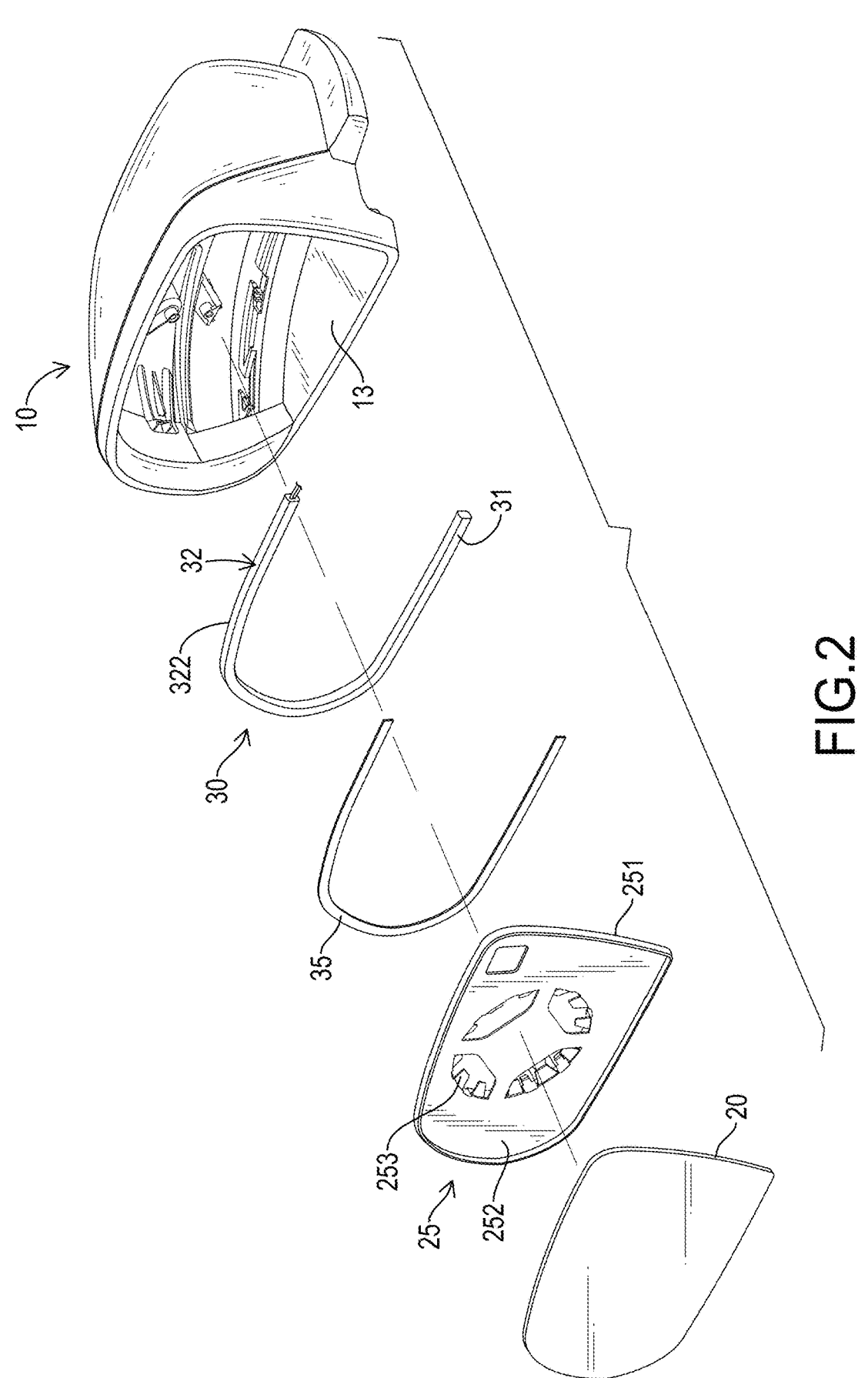
FIG. 2 is an exploded perspective view of the rearview
mirror device in FIG. 1.
Figure 3:
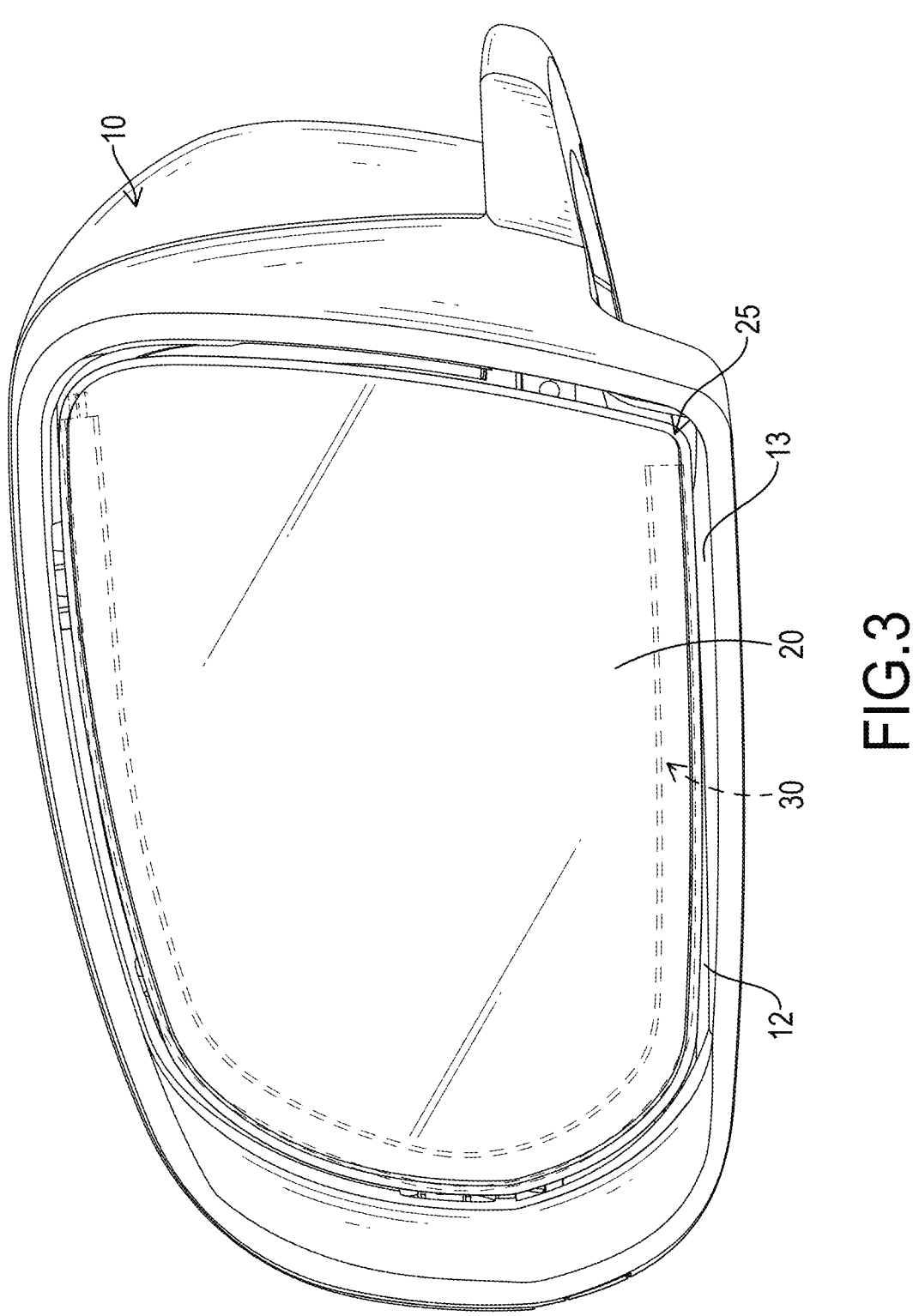
FIG. 3 is a front view of the rearview mirror device in
FIG. 1.
Figure 4:
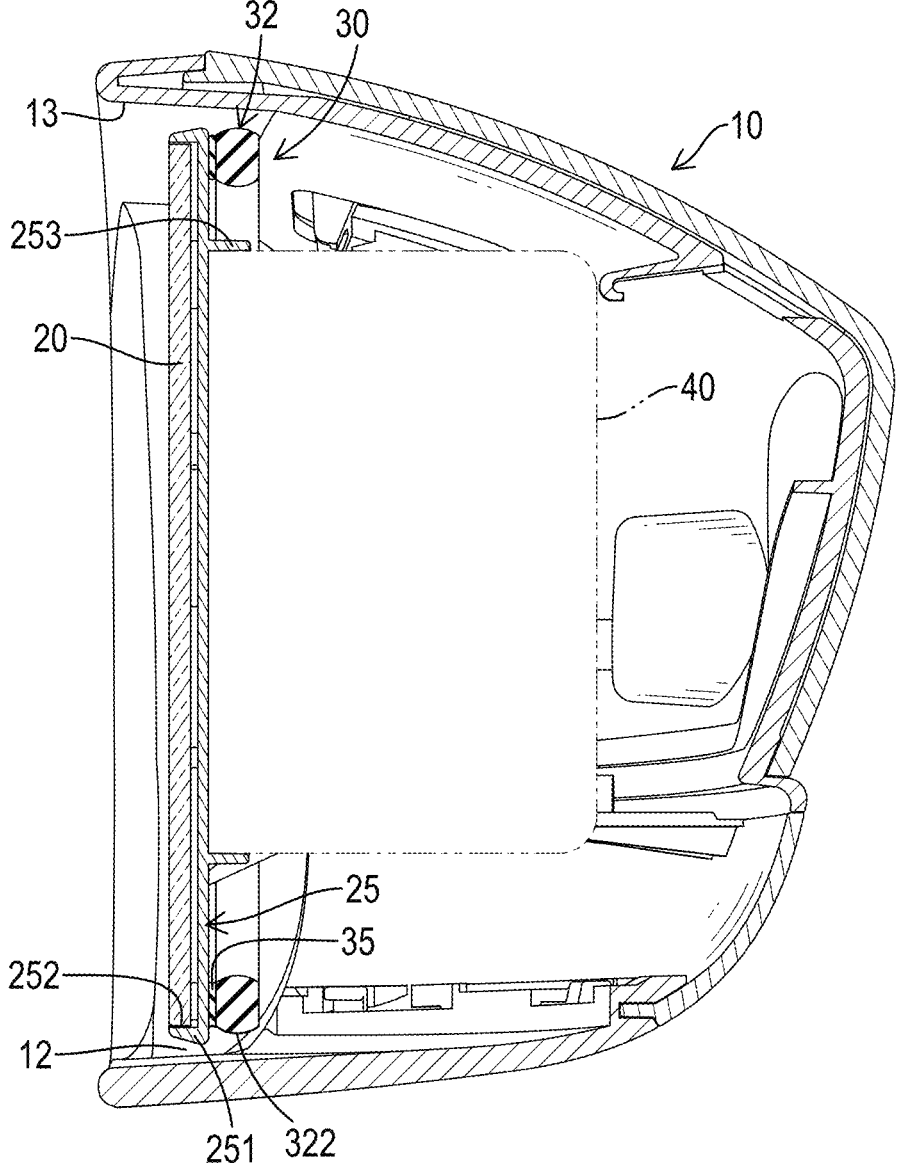
FIG. 4 is a side view in partial section of the rearview
mirror device in FIG. 1.
Figure 5:
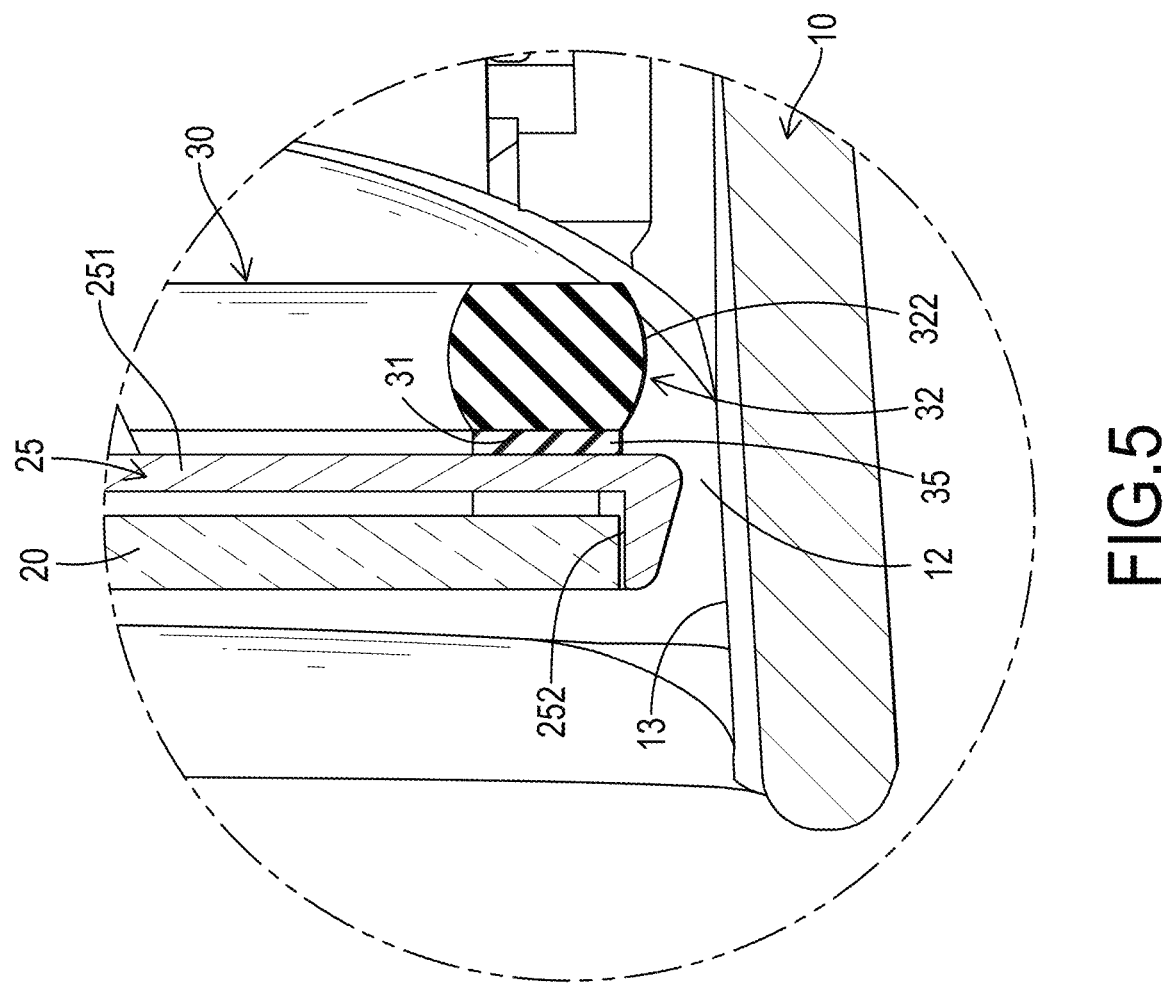
FIG. 5 is an enlarged side view in partial section of the
rearview mirror device in FIG. 4.
Figure 6:
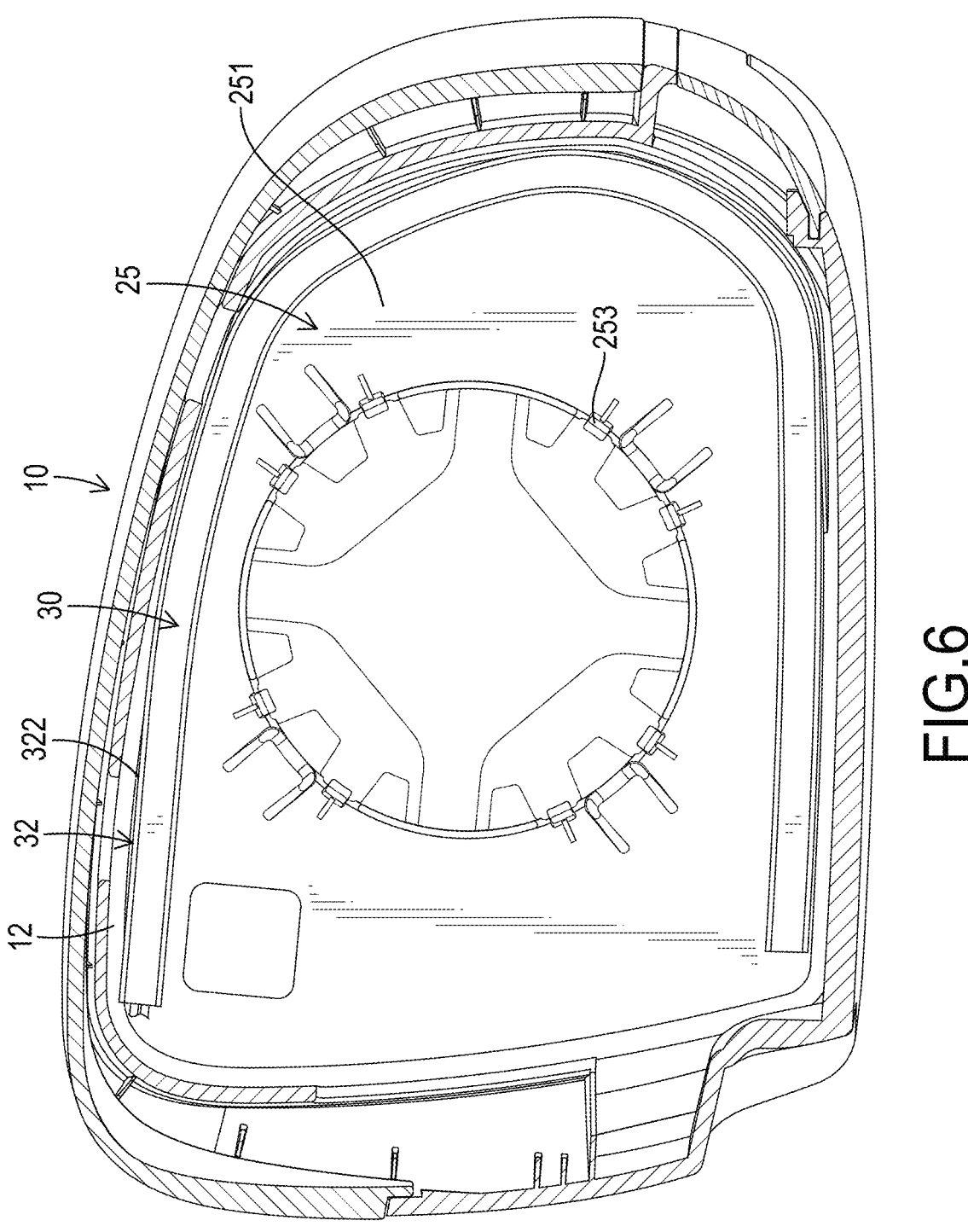
FIG. 6 is a rear view in partial section of the rearview
mirror device in FIG. 1.

DETAILED DESCRIPTION OF THE
PREFERRED EMBODIMENT

With reference to FIGS. 1 to 4, a first embodiment of a
rearview mirror device with a signal light in accordance with
the present invention comprises a housing 10, a mirror 20,
a light-transmitting gap 12, and a light emitting element 30.

The housing 10 comprises an internal peripheral surface
13. The mirror 20 is disposed in the housing 10. The
light-transmitting gap 12 is formed between the internal
peripheral surface 13 and a periphery of the mirror 20. The
light-transmitting gap 12 is annular and surrounds the mirror
20.

Figure 7:
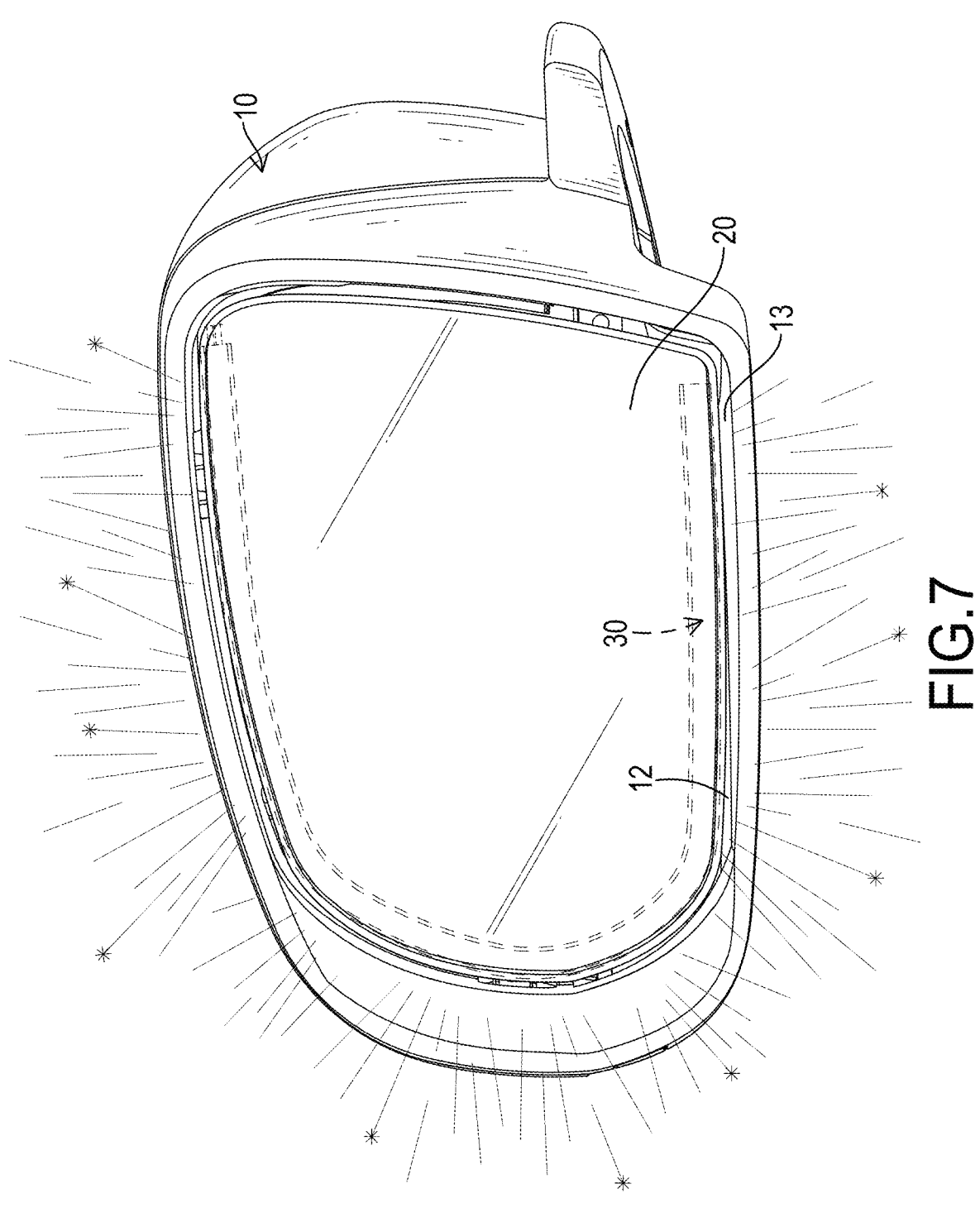
FIG. 7 is an operational front view of the rearview mirror
device in FIG. 1.

With reference to FIGS. 2 to 6, the light emitting element
30 is disposed at a rear of the mirror 20 and comprises a light
emitting portion 32 arranged along the periphery of the
mirror 20 and facing toward the internal peripheral surface
13 of the housing 10. The light emitting portion 32 has two
separate ends; in other words, the two ends of the light
emitting portion 32 are not connected with each other to turn
the light emitting portion 32 into a closed ring. With
reference to FIGS. 4, 5, and 7, when the light emitting
portion 32 emits light toward the internal peripheral surface
13 of the housing 10, the light passes through the light-
transmitting gap 12.

With reference to FIGS. 2 to 6, specifically, the rearview
mirror device further comprises an adjustable base 25 mov-
ably disposed in the housing 10. The mirror 20 is fixed to the
adjustable base 25 and can be driven to move relative to the
housing 10 by the adjustable base 25 to adjust an orientation
of the mirror 20 relative to the housing 10. The adjustable
base 25 comprises a mirror frame 251 and a connecting
holder 253. The mirror frame 251 has a chamber 252 formed
in a front of the mirror frame 251. The mirror 20 is mounted
in the chamber 252 of the mirror frame 251. The light-
transmitting gap 12 is formed between the mirror frame 251
and the internal peripheral surface 13 of the housing 10. The
connecting holder 253 is formed at a rear of the mirror frame
251 and is configured to be connected to an adjustment
device 40. The adjustment device 40 may comprise a driving
motor to drive the adjustable base 25 to move relative to the
housing 10, thereby adjusting the orientation of the mirror 20 relative to the housing 10. Detail of the adjustment device 40 is conventional and is not further illustrated in the present invention.

The light emitting element 30 is shaped as a strip and is fixed to the adjustable base 25. The light emitting element 30 is located around the connecting holder 253 and is adjacent to the periphery of the mirror 20. The light emitting element 30 comprises a light-transmitting surface 322 facing toward and spaced apart from the internal peripheral surface 13 of the housing 10. Preferably, the light-transmitting surface 322 is convex toward the internal peripheral surface 13. The light emitted by the light emitting portion 32 of the light emitting element 30 is limited to pass through the light-transmitting surface 322 and irradiates toward the internal peripheral surface 13 of the housing 10. The direction of the light is limited by the light-transmitting surface 322.

The light emitting element 30 comprises a flat surface 31 facing toward the mirror 20. The flat surface 31 of the light emitting element 30 is bonded to the rear of the mirror frame 251 of the adjustable base 25 via an adhesive 35. Furthermore, the light emitting element 30 comprises another flat surface facing away from the mirror 20. That is, the light emitting element 30 comprises two opposite flat surfaces. When the light emitting element 30 is mounted to a left side rearview mirror, the light emitting element 30 may be bonded to the mirror of the left side rearview mirror via one of the flat surfaces thereof. When the light emitting element 30 is mounted to a right side rearview mirror, the light emitting element 30 may be bonded to the mirror of the right side rearview mirror via the other one of the flat surfaces.

Preferably, with reference to FIGS. 2 to 7, the housing 10 comprises a first side, which is a side facing toward an interior of the vehicle. The light emitting element 30 is U-shaped or C-shaped. An opening facing toward the first side of the housing 10 is formed between the two ends of the light emitting portion 32 of the light emitting element 30. When the light emitting portion 32 emits light, the light may not be directed to the first side of the housing 10, whereby light may not pass through a section of the light-transmitting gap 12 corresponding to the opening of the light emitting portion 32 in position. In other words, when the light emitting portion 32 emits light, no light passes through the side of the rearview mirror device adjacent to the driver, and interference caused by light to the driver is reduced. Preferably, the light emitting portion 32 of the light emitting element 30 is arranged along the periphery of the mirror 20 and extends for larger than or equal to ⅓ times of a perimeter of the mirror 20, preferably, larger than or equal to ⅔ times of the perimeter of the mirror 20.

Figure 8:
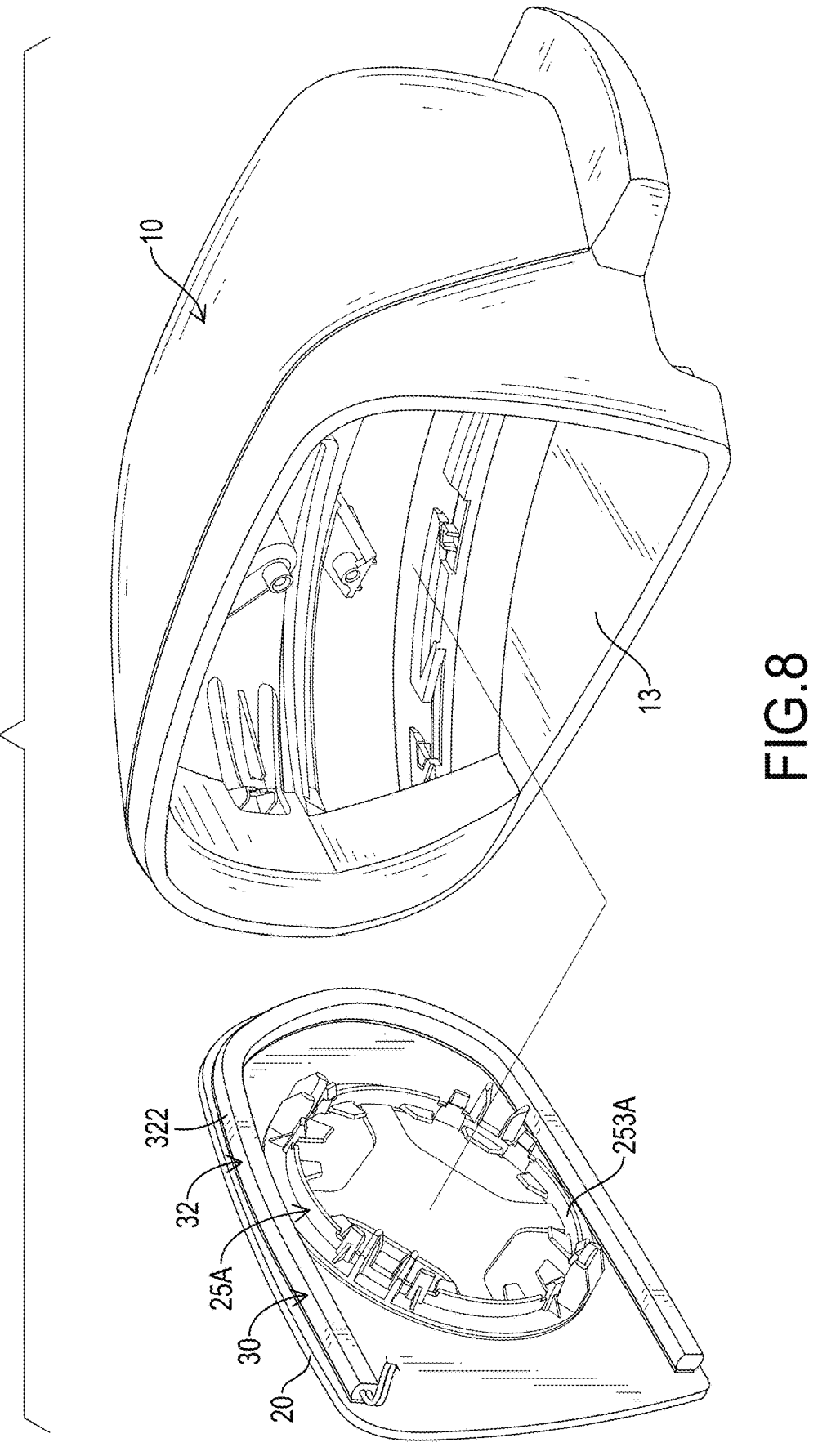
FIG. 8 is an exploded perspective view of a second
embodiment of a rearview mirror device with a signal light
in accordance with the present invention.
Figure 9:
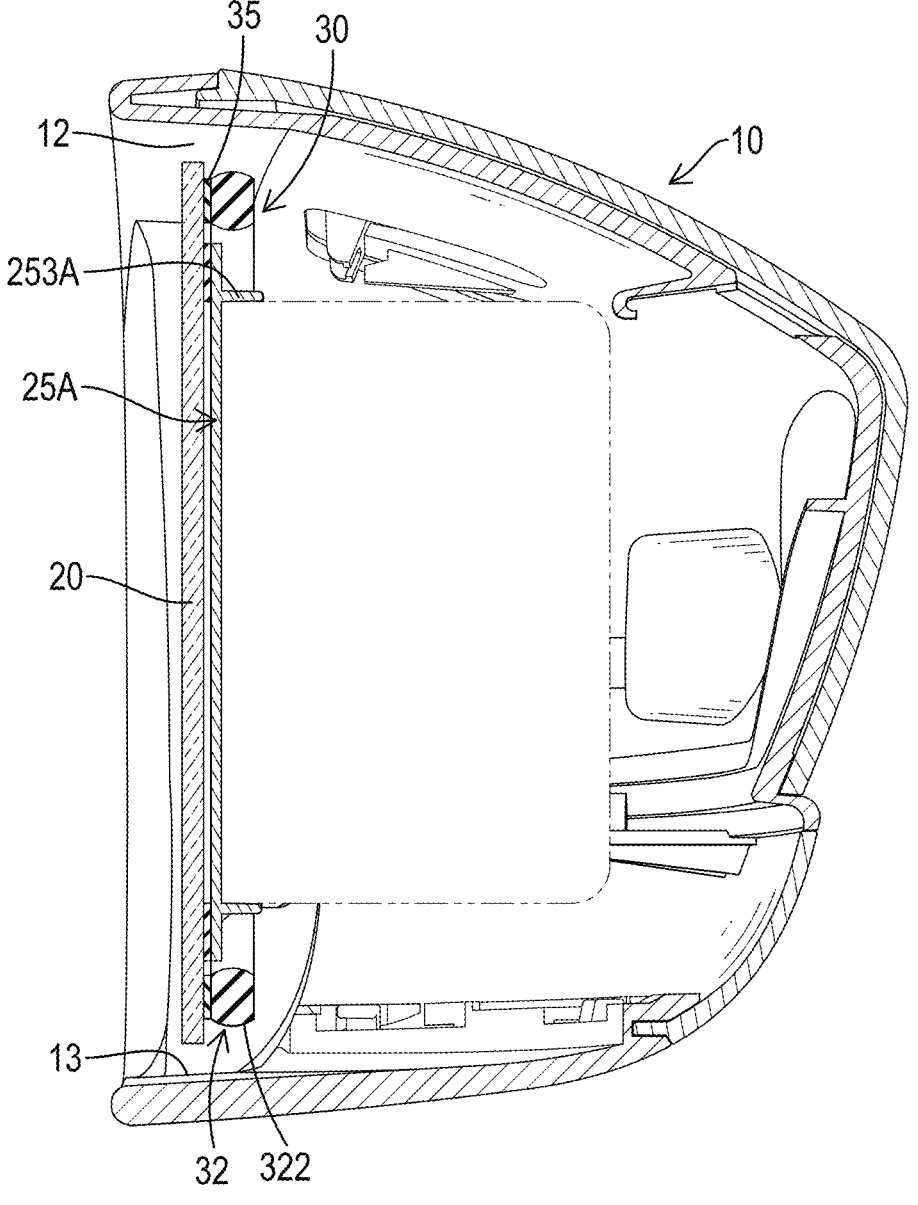
FIG. 9 is a side view in partial section of the rearview
mirror device in FIG. 8.

With reference to FIGS. 8 and 9, in a second embodiment of a rearview mirror device in accordance with the present invention, the flat surface 31 of the light emitting element 30 is bonded to the rear of the mirror 20 via an adhesive 35. The adjustable base 25A has no mirror frame and only has a connecting holder 253A configured to be connected to an adjustment device. The connecting holder 253A of the adjustable base 25A may be bonded to the rear of the mirror 20 via an adhesive. The light emitting element 30 is located around the connecting holder 253A and is adjacent to the periphery of the mirror 20.

With abovementioned arrangements, the light passing through the light-transmitting gap 12 between the housing 10 and the mirror 20 of the rearview mirror device in accordance with the present invention may be used as a direction indicator light or a blind spot detection signal light for warning the driver or other road users. Since the light emitting portion 32 of the light emitting element 30 faces toward the internal peripheral surface 13 of the housing 10 rather than directly faces to the mirror 20, the mirror 20 has no light-transmitting region, and a visible area of the mirror will not be decreased. In addition, since the light emitting portion 32 of the light emitting element 30 is arranged along the periphery of the mirror 20, a range of the signal light is increased, and the driver and other road users may easily notice the signal light.

What is claimed is:

1. A rearview mirror device with a signal light comprising:
   a housing comprising an internal peripheral surface;
   a mirror disposed in the housing;
   a light-transmitting gap formed between the internal peripheral surface of the housing and the mirror; and
   a light emitting element disposed at a rear of the mirror and comprising a light emitting portion arranged along a periphery of the mirror and facing toward the internal peripheral surface of the housing; wherein
   when the light emitting portion emits light toward the internal peripheral surface of the housing, the light passes through the light-transmitting gap;
   wherein
   the rearview mirror device comprises an adjustable base movably disposed in the housing;
   the mirror is fixed to the adjustable base and is driven to move relative to the housing by the adjustable base;
   the adjustable base comprises a connecting holder configured to be connected to an adjustment device;
   the light emitting element is located around the connecting holder and is adjacent to the periphery of the mirror;
   the light emitting element comprises a flat surface facing toward the mirror and another flat surface facing away from the mirror;
   the flat surface, facing toward the mirror, of the light emitting element is bonded to the rear of the mirror via an adhesive; and
   the connecting holder is fixed to the rear of the mirror.

2. The rearview mirror device as claimed in claim 1, wherein the light emitting element is shaped as a strip and comprises a light-transmitting surface facing toward and spaced apart from the internal peripheral surface of the housing.

3. The rearview mirror device as claimed in claim 2, wherein
   the housing comprises a first side;
   the light emitting portion of the light emitting element has two separate ends;
   an opening facing toward the first side of the housing is formed between the two separate ends of the light emitting portion of the light emitting element; and
   the light emitting portion of the light emitting element is arranged along the periphery of the mirror and extends for larger than or equal to ⅓ times of a perimeter of the mirror.

4. The rearview mirror device as claimed in claim 3, wherein the light-transmitting surface of the light emitting element is convex toward the internal peripheral surface of the housing.

5. A rearview mirror device with a signal light comprising:
   a housing comprising an internal peripheral surface;
   a mirror disposed in the housing;
   a light-transmitting gap formed between the internal peripheral surface of the housing and the mirror; and
   a light emitting element disposed at a rear of the mirror and comprising a light emitting portion arranged along a periphery of the mirror and facing toward the internal peripheral surface of the housing; wherein when the light emitting portion emits light toward the internal peripheral surface of the housing, the light passes through the light-transmitting gap; wherein the rearview mirror device comprises an adjustable base movably disposed in the housing;

the mirror is fixed to the adjustable base and is driven to move relative to the housing by the adjustable base;

the adjustable base comprises a connecting holder configured to be connected to an adjustment device; and the light emitting element is located around the connecting holder and is adjacent to the periphery of the mirror; wherein the adjustable base comprises a mirror frame having a chamber formed in a front of the mirror frame;

the mirror is mounted in the chamber of the mirror frame;

the light-transmitting gap is formed between the mirror frame and the internal peripheral surface of the housing;

the connecting holder is formed at a rear of the mirror frame;

the light emitting element comprises a flat surface facing toward the mirror and another flat surface facing away from the mirror; and the flat surface, facing toward the mirror, of the light emitting element is bonded to the rear of the mirror frame via an adhesive.

6. The rearview mirror device as claimed in claim 5, wherein the light emitting element is shaped as a strip and comprises a light-transmitting surface facing toward and spaced apart from the internal peripheral surface of the housing.

7. The rearview mirror device as claimed in claim 6, wherein the housing comprises a first side;

the light emitting portion of the light emitting element has two separate ends;

an opening facing toward the first side of the housing is formed between the two separate ends of the light emitting portion of the light emitting element; and the light emitting portion of the light emitting element is arranged along the periphery of the mirror and extends for larger than or equal to $\frac{1}{3}$ times of a perimeter of the mirror.

8. The rearview mirror device as claimed in claim 7, wherein the light-transmitting surface of the light emitting element is convex toward the internal peripheral surface of the housing.

* * * * *